United States Patent
Itoh

(10) Patent No.: US 10,464,483 B2
(45) Date of Patent: Nov. 5, 2019

(54) ON-VEHICLE IMAGE PROCESSING DEVICE

(71) Applicant: DENSO CORPORATION, Kariya, Aichi-pref. (JP)

(72) Inventor: Tomohiro Itoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 62 days.

(21) Appl. No.: 15/519,496

(22) PCT Filed: Oct. 28, 2015

(86) PCT No.: PCT/JP2015/005421
§ 371 (c)(1),
(2) Date: Apr. 14, 2017

(87) PCT Pub. No.: WO2016/072065
PCT Pub. Date: May 12, 2016

(65) Prior Publication Data
US 2017/0232897 A1    Aug. 17, 2017

(30) Foreign Application Priority Data
Nov. 4, 2014 (JP) .................................. 2014-224216

(51) Int. Cl.
*B60R 1/00* (2006.01)
*B60R 21/00* (2006.01)
(Continued)

(52) U.S. Cl.
CPC ................ *B60R 1/00* (2013.01); *B60K 35/00* (2013.01); *B60R 21/00* (2013.01); *H04N 7/183* (2013.01);
(Continued)

(58) Field of Classification Search
None
See application file for complete search history.

(56) References Cited

U.S. PATENT DOCUMENTS 9,282,294 B2 *  3/2016  Nefedov .................. H04N 7/18
2004/0155963 A1 *  8/2004  Kondo ................... G05B 15/02
348/180
(Continued)

FOREIGN PATENT DOCUMENTS

CN    102288180 B  *  7/2014
JP    2009175904 A     8/2009
(Continued)

*Primary Examiner* — Lindsay J Uhl
(74) *Attorney, Agent, or Firm* — Harness, Dickey & Pierce, P.L.C.

(57) ABSTRACT

An on-vehicle image processing device is provided. The on-vehicle image processing unit includes a signal conversion circuit arranged to convert an image signal acquired from an imaging unit into image data of a predetermined standard responding to an external command, and a control circuit arranged to acquire the image data, display an image of the imaging unit on a display unit through starting multiple modules in order, and perform data processing to the image. Upon a user performing a reversing operation, the control circuit starts a first module to display the image data acquired from the signal conversion circuit on the display unit as it is, and subsequently starts a second module to perform predetermined data processing to the image data.

4 Claims, 5 Drawing Sheets

(51) Int. Cl.
*B60K 35/00* (2006.01)
*H04N 7/18* (2006.01)

(52) U.S. Cl.
CPC    *B60K 2370/1438* (2019.05); *B60K 2370/173* (2019.05); *B60R 2300/305* (2013.01); *B60R 2300/607* (2013.01); *B60R 2300/806* (2013.01)

(56) References Cited

U.S. PATENT DOCUMENTS

| | | | |
|---|---|---|---|
| 2010/0201818 A1* | 8/2010 | Imanishi | B60R 1/00 348/148 |
| 2011/0181441 A1* | 7/2011 | Ma | B60R 1/00 340/932.2 |
| 2016/0011576 A1 | 1/2016 | Takeda et al. | |

FOREIGN PATENT DOCUMENTS

| | | | |
|---|---|---|---|
| JP | 2009284023 A | * | 12/2009 |
| JP | 2014197370 A | | 10/2014 |

* cited by examiner

ON-VEHICLE IMAGE PROCESSING DEVICE

CROSS-REFERENCE TO RELATED APPLICATIONS

This application is a U.S. National Phase Application under 35 U.S.C. 371 of International Application No. PCT/JP2015/005421 filed on Oct. 28, 2015 and published in Japanese as WO 2016/072065 A1 on May 12, 2016This application is based on and claims the benefit of priority from Japanese Patent Application No. 2014-224216 filed on Nov. 4, 2014. The entire disclosures of all of the above applications are incorporated herein by reference.

TECHNICAL FIELD

The present disclosure relates to an on-vehicle image processing device that displays on a display unit an image supplied from an imaging unit taking an image of a vehicle surrounding.

BACKGROUND ART

In recent vehicles, it is becoming popular to display an image of a rear view camera (hereinafter, a camera image) on a display arranged at an instrument panel, for example at the time of the reversing operation by a user (a driver), by an image processing device. Therefore, the user can perform the reversing operation of the vehicle, confirming the safety of the vehicle backward by confirming visually the camera image.

Patent Literature 1: Japanese Patent Application No. 2013-46604

SUMMARY OF INVENTION

When a CPU (Central Processing Unit) mounted in the image display device is started up responding to ON of an ACC switch, the CPU starts in sequence various kinds of modules (programs) stored in a memory, to display a camera image and to draw a guide line indicative of the reverse traveling direction of the vehicle on the camera image.

Here, a module to display the camera image is executed in an HMI (Human Machine Interface) process of which the start-up is slow; therefore, it takes a comparatively long period to display the camera image.

For example, the KT safety act (Kids and Transportation Safety Act) in the United States of America requires that, when a reversing operation is performed by a user after the elapse of 4 seconds since an ACC of the vehicle is set to ON or an ignition switch is set to ON, the camera image shall be displayed within 2 seconds since the reversing operation. The period of 4 seconds expects preparation time necessary for displaying the camera image after the CPU starts. Therefore, it is difficult for an image display device in the related art to satisfy the KT safety act.

The image display device disclosed in Patent Literature 1, which was earlier filed by the applicant of the present application, provides a sub CPU to display a camera image directly on a display in addition to the above-described CPU (hereinafter, a main CPU), and performs the so-called camera-through image display that displays the camera image directly on the display by use of the sub CPU at the time of the first reversing operation by the user. That is, in lieu of the main CPU starting the module to display the camera image by the HMI process, the sub CPU performs the camera-through image display to quickly display the camera image on the display. Then, when the start-up of the module to draw a guide line on the camera image by the main CPU is completed, the camera-through image by the sub CPU is switched to the guide line-drawn image by the main CPU. Consequently, the KT safety act is satisfied.

However, in the image display device disclosed in Patent Literature 1, when switching from the camera-through image by the sub CPU to the guide line-drawn image by the main CPU, there arises the phenomenon in which a noise will be displayed on the display for a short time, because the switching timing and the display timing are not in synchronization with each other. Accordingly, at the timing of switching from the camera-through image by the sub CPU to the guide line-drawn image by the main CPU, a black image (black screen) is displayed for 2 seconds for example in order to hide the noise, with the aim of improving the appearance.

However, because display of the black image on the camera image is not desirable from a viewpoint of safety, the camera-through image display of the camera image is actually extended until the reversing operation is released, and the guide line is not displayed in the first reversing operation by the user. Because the start-up of the module to draw the guide line and the module to display the camera image by the main CPU is completed at the time of the second reversing operation by the user, the guide line can be drawn on the camera image, without displaying a black image on the camera image.

The present disclosure has been made in view of the above circumstances, and has an object to provide an on-vehicle image processing device that can quickly display an image of a camera imaging a vehicle surrounding at a time of a reversing operation by a user and that can perform data processing without displaying a black image to the image.

An on-vehicle image processing device in an aspect of the present disclosure comprises: a signal conversion circuit arranged to acquire an image signal from an imaging unit imaging a vehicle surrounding, and convert the acquired image signal into image data of a predetermined standard responding to an external command; and a control circuit arranged to acquire the image data from the signal conversion circuit, display an image of the imaging unit on a display unit through starting a plurality of modules in order, and perform data processing to the image. Upon a user performing a reversing operation, the control circuit starts a first module to display the image data acquired from the signal conversion circuit on the display unit as it is, and subsequently starts a second module to perform predetermined data processing to the image data.

According to the on-vehicle image processing device, the control circuit starts the first module to display the image of the imaging unit on the display unit, upon the user performing the reversing operation. Accordingly, the image of the vehicle surrounding can be quickly displayed in the same manner as in the camera-through image display in the related art. The second module to perform the data processing to the image data of the imaging unit is started up subsequently. Accordingly, the data processing of the image data of the imaging unit can be quickly performed. In this case, the control circuit performs directly the data processing of the image data of the imaging unit. Accordingly, there is no need of displaying a black image.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, one embodiment is described with reference to accompanying drawings.

Figure 1:
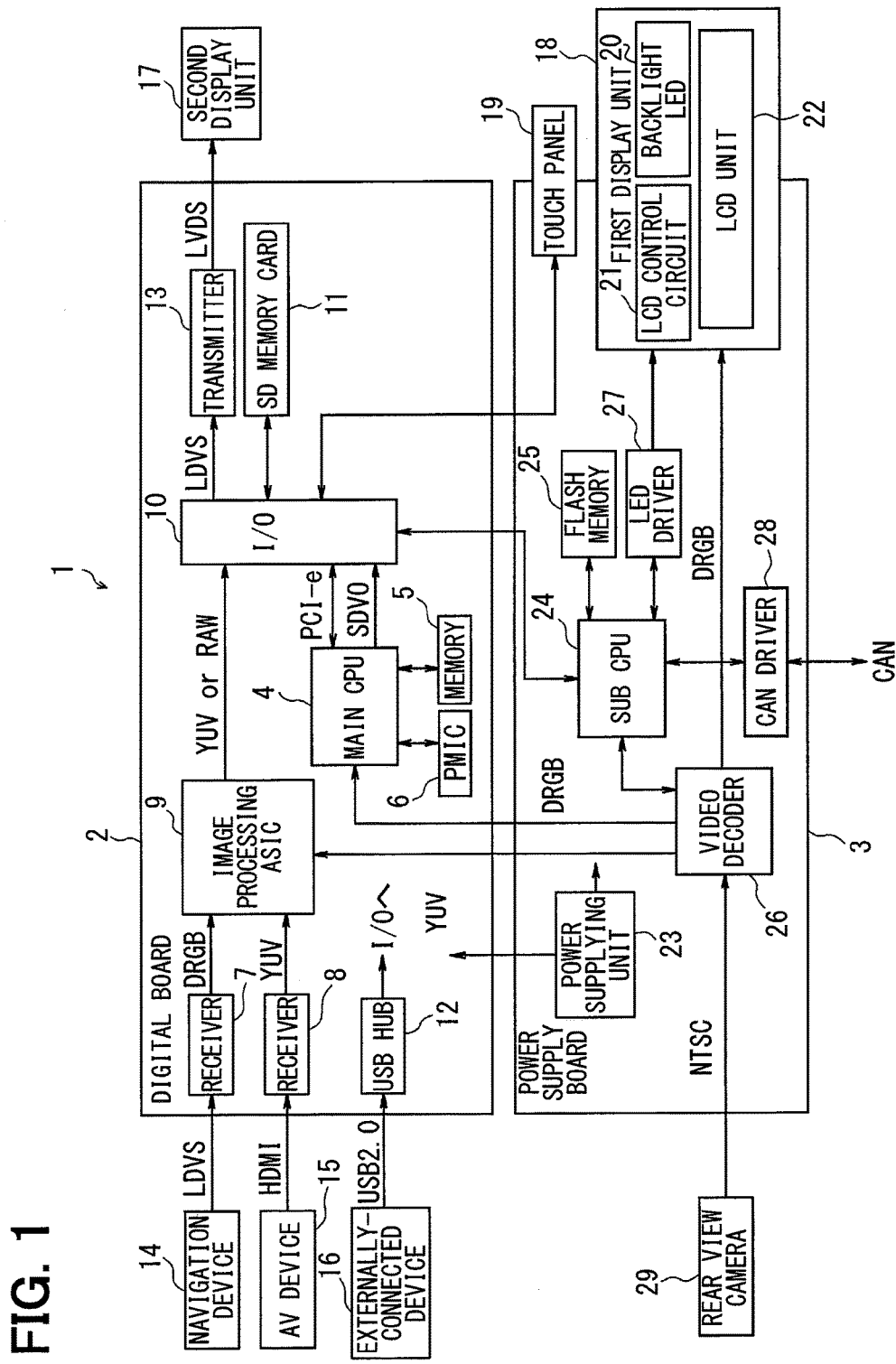
FIG. 1 is a functional block diagram illustrating a configuration of an image processing device according to one embodiment.

As illustrated in FIG. 1, an image processing device 1 is mounted in a vehicle (not shown) and may be attached to the vehicle in a fixed or removable manner. The image processing device 1 includes a digital board 2 and a power supply board 3. The digital board 2 and the power supply board 3 are electrically coupled via wiring. In FIG. 1, only the configuration of an image processing system is shown and the configuration of a sound processing system is not shown.

The digital board 2 controls the whole operation and contains at least a main CPU 4 (a control circuit), a memory 5, a PMIC (Power Management Integrated Circuit) 6, receivers 7 and 8, an image processing ASIC (Application Specific Integrated Circuit) 9 (a signal conversion circuit), an I/O 10, an SD memory card (registered trademark) 11, a USB hub 12, and a transmitter 13.

The main CPU 4 is a general-purpose CPU of a one-core or two-core type, operating at an operating frequency of 1 GHz to 2 GHz, for example. The main CPU 4 executes image processing by reading into the memory 5 and executing an OS (Operating System) and a module (program) stored in the SD memory card 11.

The PMIC 6 manages the operating power of the main CPU 4. The PMIC 6 determines the state of the main CPU 4 by acquiring periodically a state notification command indicative of the self-state of the main CPU 4, and controls the operating power to be supplied to the main CPU 4 according to the determination result. That is, when the PMIC 6 determines that the main CPU 4 is in a light-load state (such as an idle state), the PMIC 6 decreases the operating power to be supplied to the main CPU 4, giving priority to power saving. On the other hand, when the PMIC 6 determines that the main CPU 4 is in a heavy-load state, the PMIC 6 increases the operating power to be supplied to the main CPU 4, giving priority to processing speed.

The receiver 7 acquires an image signal of an LVDS (Low Voltage Differential Signaling) standard for example, from a navigation device 14 coupled externally, performs parallel conversion of the acquired image signal to a DRGB standard, and outputs the conversion result to the image processing ASIC 9.

The receiver 8 acquires an image signal of an HDMI (High-Definition Multimedia Interface (registered trademark)) standard from an AV (Audio Visual) device 15 coupled externally, performs parallel conversion of the acquired image signal to a YUV standard, and outputs the conversion result to the image processing ASIC 9.

The image processing ASIC 9 is capable of acquiring the image data of multiple standards, converts the acquired image data into a predetermined standard, and outputs the conversion result to the I/O 10. That is, the main CPU 4 is a general-purpose CPU, incapable of acquiring directly and processing the image data outputted by the receivers 7 and 8. Therefore, the image processing ASIC 9 converts the standard of the image data into the standard that the main CPU 4 can process. For example, the image processing ASIC 9 outputs the acquired image signal as it is when the acquired image signal is the DRGB standard, converts the DRGB standard into the YUV standard, or converts the DRGB standard into an RAW standard.

The USB hub 12 acquires image data of a USB 2.0 standard from an externally-connected device 16, and outputs the image data to the I/O 10.

The I/O 10 is capable of outputting the image data acquired from the image processing ASIC 9 and the USB hub 12 to a second display unit 17 via the transmitter 13 in the LVDS standard. The second display unit 17 is installed in an instrument panel in the vehicle cabin. The I/O 10 is coupled to the main CPU 4 via a bus of a PCI-express standard, and is capable of outputting the image data to the main CPU 4.

The main CPU 4 is capable of outputting the data-processed image data to the I/O 10 in an SDVO (Serial Digital Video Out) standard.

The power supply board 3 is provided with a first display unit 18 (corresponding to a display unit and a display means) and a touch panel 19 in an integrated fashion. The first display unit 18 includes a backlight LED 20, an LCD control circuit 21, and a liquid crystal display unit 22. The LCD control circuit 21 controls the display of the liquid crystal display unit 22. The touch panel 19 outputs data indicative of a touch position to the I/O 10 of the digital board 2.

The power supply board 3 contains at least a power supplying unit 23, a sub CPU 24, a flash memory 25, a video decoder 26 (a signal conversion circuit), an LED driver 27, and a CAN (Controller Area Network) driver 28.

Responding to the operation of an ACC switch (not shown) by a user, the power supplying unit 23 steps down a voltage supplied from a vehicle power source (a vehicle battery) mounted in the vehicle to a predetermined supply voltage, and supplies the stepped-down voltage to each electric circuit in the digital board 2 and the power supply board 3.

The sub CPU 24 reads and executes a small capacity OS called a real-time OS stored in the flash memory 25. The sub CPU 24 is network-connected to a different ECU (Engine Control Unit, not shown) through the CAN driver 28, and acquires information necessary for the camera control from the different ECU. The information necessary for the camera control includes gear shift information from a gear shift position sensor and steering angle information from a steering angle sensor.

The video decoder 26 acquires an image signal of an NTSC (National Television System Committee) standard from a rear view camera 29 (corresponding to an imaging unit and an imaging means), which images a vehicle backward. The video decoder 26 decodes the acquired image signal according to instructions of the sub CPU 24 to generate image data of the YUV standard, and outputs the image data to the image processing ASIC 9. The video decoder 26 also outputs the image data acquired from the main CPU 4 according to instructions of the sub CPU 24 to the first display unit 18. The first display unit 18 draws an image based on the image data acquired from the video decoder 26. The first display unit 18 is installed in the instrument panel in the vehicle cabin as is the case of the second display unit 17, and is arranged in the upper position of the second display unit 17. In this case, the first display unit 18 displays the information of a high degree of importance, such as the map image by the navigation device 14 and the image of the rear view camera 29 (hereinafter, a camera image). On the other hand, the second display unit 17 displays the information of a low degree of importance, such as supplementary information of the navigation device 14, air-conditioner information, and audio information, according to operation by manual operation buttons (not shown) arranged around the second display unit 17.

The LED driver 27 drives the backlight LED 20 to illuminate, according to the instructions from the sub CPU 24.

Figure 2:
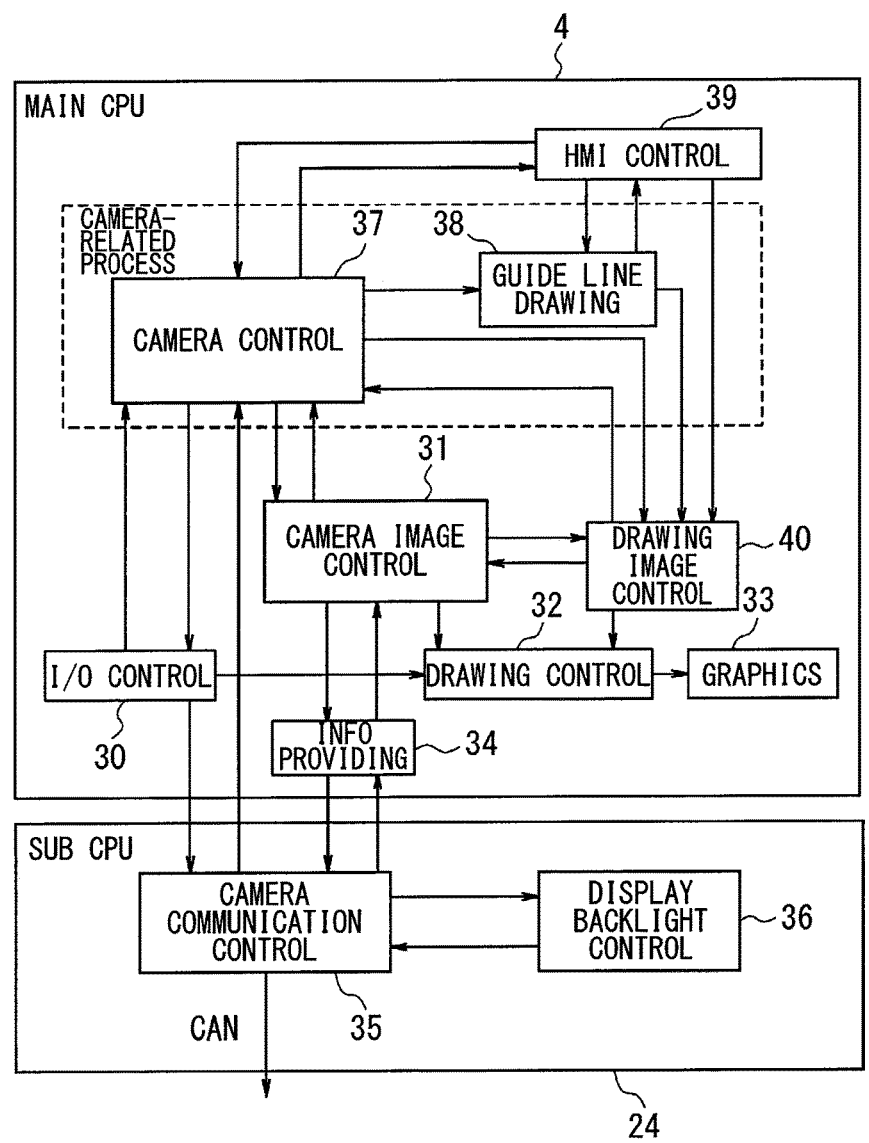
FIG. 2 is a drawing illustrating the relation of modules executed by a main CPU and a sub CPU.

The main CPU 4 of the digital board 2 starts up each module illustrated in FIG. 2 by executing the OS.

An I/O control module 30 (a fourth module) always keeps the power supply of the rear view camera 29 in the on state. Accordingly, waiting for the image synchronization until the turn on of the rear view camera 29 becomes unnecessary, and it is possible to shorten the period until the camera image is displayed. The power supply of the rear view camera 29 is turned off when the ACC is turned off.

Figure 3:
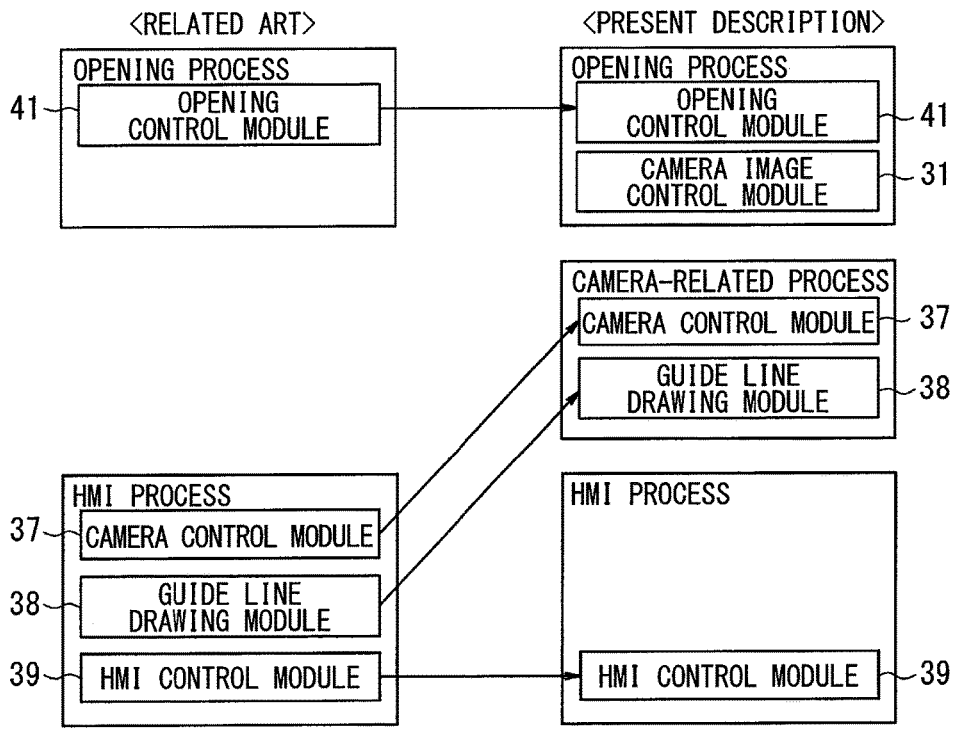
FIG. 3 is a drawing illustrating the order of start-up of each module as compared with the related art.

A camera image control module 31 (a first module) is a module that is not configured in the opening process in the related art, as illustrated in FIG. 3. That is, the camera image control module 31 is newly added in the opening process because the start-up performance equivalent to the display of an opening image is required in order to satisfy the performance demand for displaying the camera image quickly. The camera image control module 31 outputs the image data to a drawing control module 32 as it is, when the camera image data is acquired from the image processing ASIC 9. The drawing control module 32 converts the acquired image data into drawable data, and outputs the converted data to a graphics module 33. Then, the graphics module 33 draws the acquired data to the first display unit 18.

An information providing module 34 provides the camera image control module 31 with the information acquired by a camera communication control module 35 executed by the sub CPU 24. That is, the camera communication control module 35 holds the information necessary for the camera display acquired from the different ECU via the CAN network, and accordingly provides the information. The information providing module 34 is a newly added module and the start-up order thereof is set up low. This is because, when the main CPU 4 attempts to acquire the information necessary for the display of the camera image early, the start-up of the main CPU 4 is delayed and the influence on the start-up performance (time) becomes large. A display backlight control module 36 executed by the sub CPU 24 adjusts the illumination intensity of the backlight LED 20 based on the information acquired by the camera communication control module 35 (illumination intensity operation information by the user).

As illustrated in FIG. 3, a camera control module 37 and a guide line drawing module 38 (a second module) constitute a newly added camera-related process and draw a guide line on the camera image. The camera control module 37 and the guide line drawing module 38 constitute the camera-related process independent of the HMI process in the related art, and the start-up order thereof is set higher than the HMI process. This is because, when the attempt is made to quickly draw the guide line by the HMI process in the related art, the process separation from the HMI process is required, increasing the number of processes and retarding the start-up of the main CPU 4.

Figure 7:
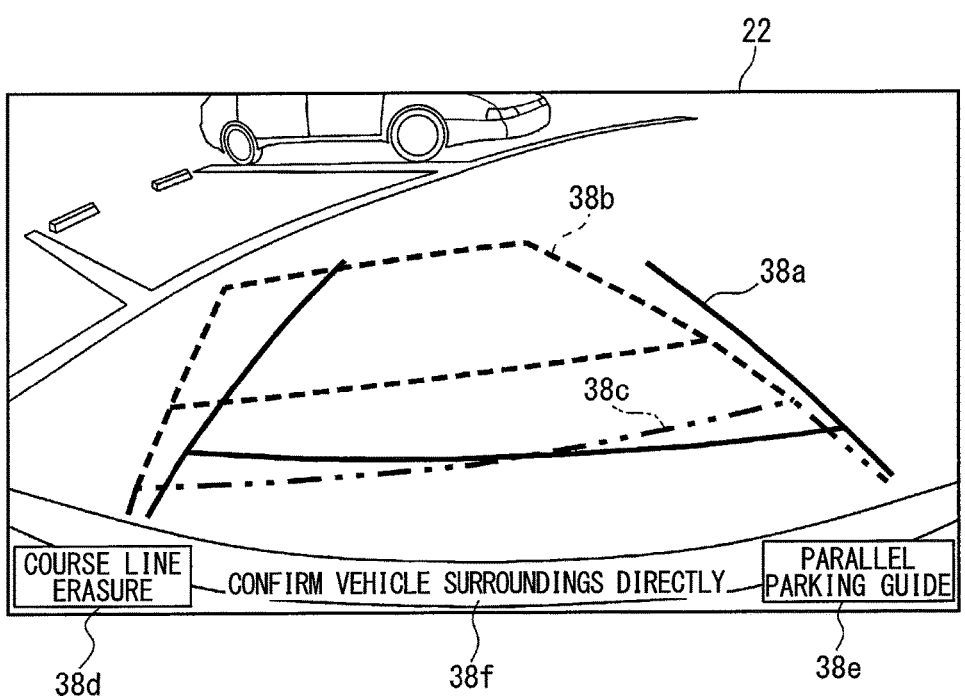
FIG. 7 is a drawing illustrating an image of the rear view camera on which guide lines and user assistance information are drawn.

A guide line drawing module 38 draws the guide line on the camera image. As illustrated in FIG. 7, the guide line includes a vehicle width extension 38*a* (a solid line) indicative of an extended line of the vehicle width, a course prediction line 38*b* (a dashed line) indicative of a predicated line of the reverse traveling course of the vehicle, and a distance guide line 38*c* (a two-dot and dash line) indicative of about 0.5 meter beyond from the vehicle rear end. The first display unit 18 displays the vehicle width extension 38*a* in green, the course prediction line 38*b* in yellow, and the distance guide line 38*c* in red, accordingly facilitating the visual confirmation of the guide lines.

An HMI control module 39 (a third module) draws user assistance information on the camera image, and the start-up timing thereof is set as in the related art as illustrated in FIG. 3. As illustrated in FIG. 7, the user assistance information includes a user-operable "course line erasure" button 38*d*, a user-operable "parallel parking guide" button 38*e*, and a precautionary statement 38*f* saying "confirm the vehicle surrounding directly."

A drawing image control module 40 transfers the image data from the camera image control module 31, the camera control module 37, the guide line drawing module 38, and the HMI control module 39, to the drawing control module 32. In this case, as illustrated in FIG. 2, the camera image control module 31 and the drawing image control module 40 transfer the image data mutually between them, avoiding the influence of the other modules. This is to prevent the map image outputted by the navigation device 14 from being displayed while the camera image is displayed.

The following explains the operation of the above-described configuration.

When the user turns on the ACC switch of the vehicle, the operating power is supplied to the power supplying unit 23 from the vehicle power source. When the operating power is supplied, the power supplying unit 23 supplies electric power to each electric circuit of the power supply board 3 and the digital board 2. When the operating power is supplied from the power supplying unit 23, the sub CPU 24 is started up to read and to execute the OS stored in the flash memory 25.

Figure 4:
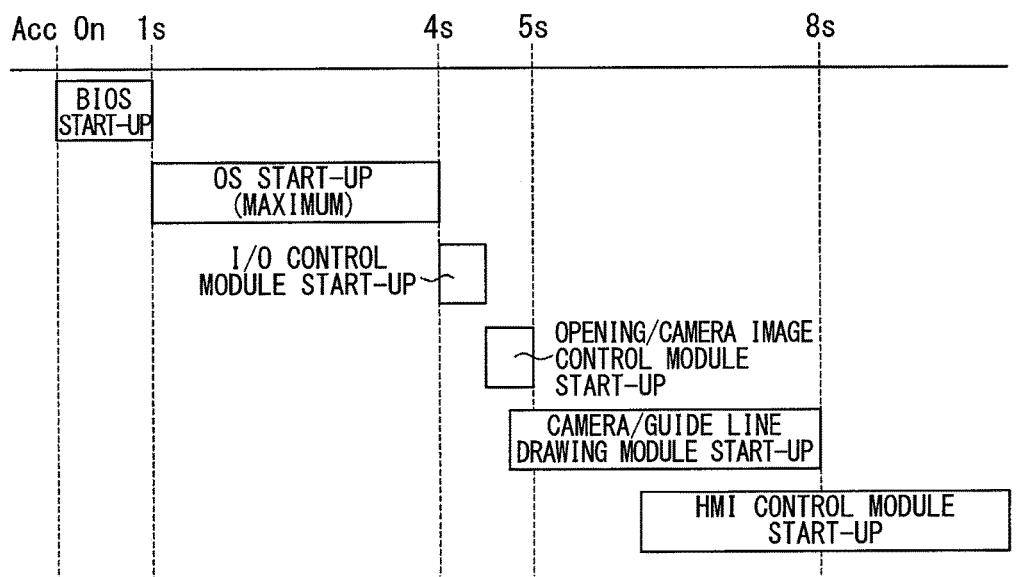
FIG. 4 is a timing chart illustrating the order of the start-up of the modules.

When the operating power is supplied, the main CPU 4 starts the BIOS (Basic Input Output System) and performs a hardware check, as shown in FIG. 4. When the hardware check completes normally, the main CPU 4 reads the OS stored in the SD memory card 11 into the memory 5 and starts the OS. After the start-up of the OS has completed, the main CPU 4 manages the whole operation by using the OS. In this case, a maximum of 4 seconds are needed from ON of the ACC to the completion of the start-up of the OS. In the KT safety act, 4 seconds are expected as the preparation time until the display of the camera image becomes available. Accordingly, it is necessary to complete the start-up of the process of displaying the camera image within 2 seconds after the start-up of the OS has completed. That is, the camera image can be displayed within 2 seconds after the start-up of the OS has completed, even when the reversing operation by the user is performed immediately after the start-up of the OS has completed, the camera image can be displayed within 2 seconds after the reversing operation.

Now, when the user operates the gear shift lever to a reverse position in order to reverse the vehicle, the sub CPU 24 detects that the user has operated the gear shift lever to the reverse position by the CAN communication, and instructs the video decoder 26 to perform the signal conversion of the image signal outputted from the rear view camera 29 and to output the converted image signal to the image processing ASIC 9. Responding to the instructions by the sub CPU 24, the video decoder 26 converts the image signal outputted from the rear view camera 29 into a YUV signal and outputs the converted image signal to the image processing ASIC 9. The image processing ASIC 9 converts the standard of the image data acquired from the video decoder 26, and outputs the converted image data to the main CPU 4 via the I/O 10.

Figure 6:
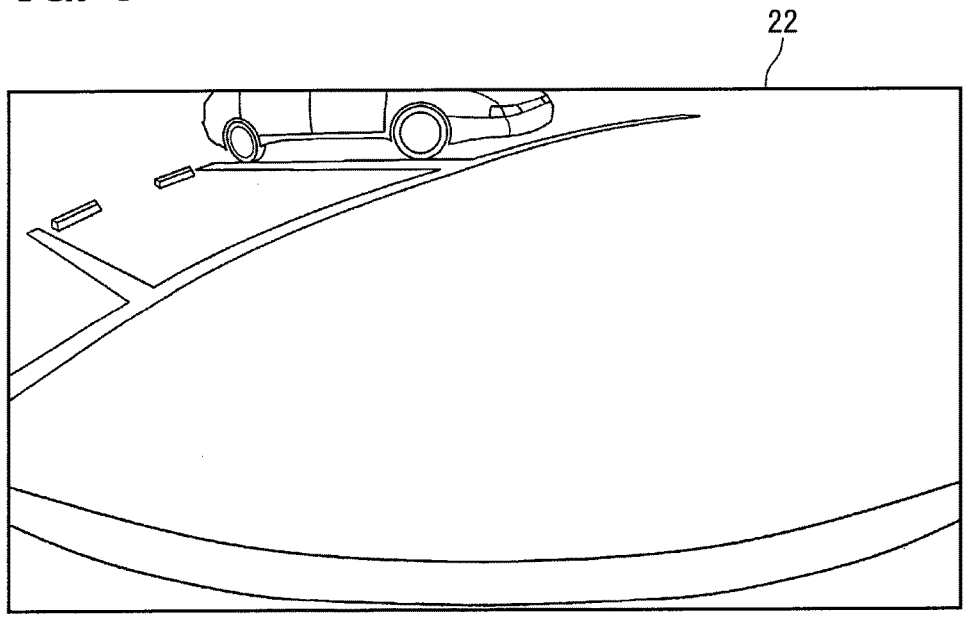
FIG. 6 is a drawing illustrating an image of a rear view camera.

When the start-up of the OS is completed, the main CPU 4 starts up in order each module illustrated in FIG. 2 by using the OS. Specifically, as illustrated in FIG. 4, after the power supply of the rear view camera 29 is turned on by the start-up of the I/O control module 30, the opening module 41 and the camera image control module 31 are started up. The opening image is displayed upon completion of the start-up of the opening module 41. Upon completion of the start-up of the camera image control module 31, the image data of the rear view camera 29 acquired from the image processing ASIC 9 is converted into the DRGB signal and is outputted to the first display unit 18 via the video decoder 26. The first display unit 18 displays the camera image that is not subjected to the data processing, as illustrated in FIG. 6. Therefore, the user can confirm visually the image taken by the rear view camera 29 as it is. That is, it becomes possible for the main CPU 4 to perform the camera-through image display as in the related art.

Next, the main CPU 4 starts the camera control module 37 and the guide line drawing module 38 which constitute the camera-related process, and draws the guide line on the camera image. That is, the main CPU 4 executes the processing to draw the guide line data to the image data acquired from the image processing ASIC 9. This guide line is provided with the vehicle width extension 38a, the course prediction line 38b, and the distance guide line 38c, as illustrated in FIG. 7. The user can confirm the reverse traveling direction of the vehicle with the aid of the guide line (the vehicle width extension 38a, the course prediction line 38b, and the distance guide line 38c) displayed on the image taken by the rear view camera 29. In this case, the sub CPU 24 creates the course prediction line 38b based on the steering angle information acquired from the steering angle sensor via the CAN driver 28.

Next, the main CPU 4 starts the HMI control module 39 illustrated in FIG. 2, and draws the user assistance information on the camera image. That is, the main CPU 4 executes the processing to draw a camera switch and a precautionary statement to the image data acquired from the image processing ASIC 9. As illustrated in FIG. 7, the user assistance information includes the "course line erasure" button 38d, the "parallel parking guide" button 38e, and the precautionary statement 38f saying "confirm vehicle surroundings directly." The user can receive the support at the time of the reversing operation with the aid of the user assistance information displayed on the image taken by the rear view camera 29.

When the reversing operation by the user is released, the main CPU 4 switches to the map image outputted from the navigation device 14. At this moment, the map image is displayed after the black image is displayed, in order to prevent the switching noise from being displayed.

Figure 5:
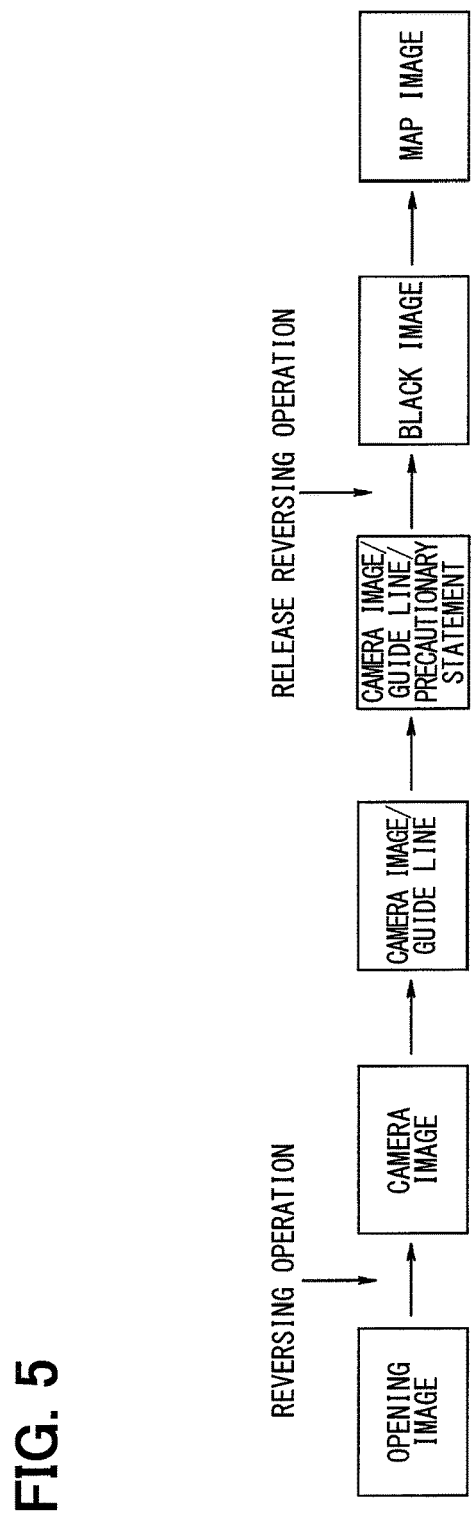
FIG. 5 is a drawing illustrating displayed content displayed on a first display unit.

According to the above operation, when the reversing operation by the user is performed after ON of the ACC, as illustrated in FIG. 5, the first display unit 18 displays, in sequence, the opening image-->the camera image-->the camera image/the guide line-->the camera image/the guide line/the precautionary statement-->the black image-->the map image.

This embodiment provides the following advantages.

Upon completion of the start-up of the OS, the main CPU 4 starts the camera image control module 31 which displays the camera image on the first display unit 18 as it is by using the OS. Accordingly, the image of the vehicle backward can be quickly displayed at the time of the reversing operation by the user, as is the case with the camera-through image display in the related art. Next to the camera image control module 31, the main CPU 4 starts the camera control module 37 and the guide line drawing module 38 which draw the guide line on the camera image. Accordingly, the guide line can be quickly drawn on the camera image. In this case, the main CPU 4 draws the guide line to the rear view camera image directly; therefore, it is not necessary to display the black image.

The HMI control module 39 is started up next to the camera control module 37 and the guide line drawing module 38. Accordingly, deterioration of the display performance of the camera image is prevented.

The I/O control module 30 is started up earlier than the camera image control module 31. Accordingly, it is not necessary to wait for the image synchronization until the rear view camera 29 is turned on, and the period required for displaying the camera image can be shortened.

The main CPU 4 corresponds to a control circuit. The image processing ASIC 9 corresponds to a signal conversion circuit. The first display unit 18 corresponds to a display means (display unit). The video decoder 26 corresponds to a signal conversion circuit. The rear view camera 29 corresponds to an imaging camera means (imaging unit) and a rear view imaging means. The I/O control module 30 corresponds to a fourth module. The camera image control module 31 corresponds to a first module. The camera control module 37 corresponds to a second module. The guide line drawing module 38 corresponds to a second module. The HMI control module 39 corresponds to a third module.

(Other Embodiments)

The above illustrated embodiment is not limiting and can be modified and extended variously.

For example, the digital board 2 and the power supply board 3 may be unified. In this case, the sub CPU 24 may be omitted and the main CPU 4 may execute the operation of the sub CPU 24.

A side view camera to take an image of the lateral side of the vehicle may be mounted, and the image from the side view camera may be quickly displayed at the time of the reversing operation by the user.

Cameras may be mounted at the front, rear, right, and left corner parts of the vehicle, and at the time of the reversing operation by the user, a bird's-eye view image from above the vehicle may be generated based on the images of the cameras, and may be quickly displayed.

The video decoder 26 may be omitted, and the image processing ASIC 9 may acquire the image signal from the rear view camera 29 and may convert the standard of the signal.

The image data processed by the main CPU 4 may be outputted directly to the first display unit 18.

What is claimed is:

1. An on-vehicle image processing device comprising:
   a digital board that includes a main CPU and an image processing application specific integrated circuit (ASIC), the image processing ASIC being configured to acquire an image signal from an imaging unit imaging a vehicle surroundings and convert the acquired image signal into image data of a predetermined standard responding to an external command, the image data representing an image of the vehicle surroundings; and a power supply board that includes a sub CPU, a power supplying unit, a video decoder, and a display unit, the sub CPU having a smaller processing capacity than the main CPU and the video decoder acquiring the image signal from the imaging unit;

wherein upon a user performing a reversing operation:

the sub CPU instructs the video decoder to output the image signal from the imaging unit to the image processing ASIC and the image processing ASIC outputs the image data to the main CPU, the main CPU being configured to acquire the image data from the image processing ASIC, display the image of the vehicle surroundings on the display unit, perform predetermined data processing on the image data, and the main CPU initially displays the image represented by the image data acquired from the image processing ASIC on the display unit as it is without performing the predetermined data processing on the image data, and subsequently directly performs the predetermined data processing on the image data displayed on the display unit without displaying a black image on the display unit between when the image represented by the image data is displayed as it is and when the image represented by the image data is displayed after the predetermined data processing is performed, the predetermined data processing including processing the image data to draw at least one guide line on the image of the vehicle surroundings.

2. The on-vehicle image processing device according to claim 1, wherein:
the imaging unit is a rear view imaging unit imaging the vehicle surroundings behind the vehicle.

3. The on-vehicle image processing device according to claim 2, wherein,
the main CPU draws user assistance information on the image.

4. The on-vehicle image processing device according to claim 1, wherein
the main CPU keeps a power supply of the imaging unit in an on-state.

* * * * *